United States Patent
Tomlin

(10) Patent No.: US 9,092,160 B2
(45) Date of Patent: Jul. 28, 2015

(54) SELECTIVE ENABLEMENT OF OPERATING MODES OR FEATURES VIA HOST TRANSFER RATE DETECTION

(75) Inventor: Andrew John Tomlin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/983,251

(22) PCT Filed: Feb. 2, 2012

(86) PCT No.: PCT/US2012/023567
§ 371 (c)(1),
(2), (4) Date: Aug. 1, 2013

(87) PCT Pub. No.: WO2012/109078
PCT Pub. Date: Aug. 16, 2012

(65) Prior Publication Data
US 2013/0318289 A1    Nov. 28, 2013

Related U.S. Application Data

(60) Provisional application No. 61/440,710, filed on Feb. 8, 2011.

(51) Int. Cl.
*G06F 3/01* (2006.01)
*G06F 3/06* (2006.01)
*G06F 13/38* (2006.01)
*G06F 13/12* (2006.01)

(52) U.S. Cl.
CPC ............. *G06F 3/0688* (2013.01); *G06F 3/061* (2013.01); *G06F 3/0634* (2013.01); *G06F 13/385* (2013.01); *G06F 13/126* (2013.01)

(58) Field of Classification Search
None
See application file for complete search history.

(56) References Cited

U.S. PATENT DOCUMENTS

| 7,284,082 | B2 | 10/2007 | Greenberger | |
|---|---|---|---|---|
| 7,747,796 | B1 | 6/2010 | Kumar et al. | |
| 2003/0056041 | A1* | 3/2003 | Connor et al. | 710/58 |
| 2006/0026315 | A1* | 2/2006 | Hong et al. | 710/60 |
| 2009/0300259 | A1 | 12/2009 | Luo et al. | |

(Continued)

OTHER PUBLICATIONS

International Search Report in the parent PCT/US12/23567, 3 pages.

(Continued)

*Primary Examiner* — Kaushikkumar Patel
(74) *Attorney, Agent, or Firm* — Taylor English Duma LLP

(57) ABSTRACT

Selective enablement of operating modes or features of a storage system via host transfer rate detection enables, in some situations, enhanced performance. For example, a Solid-State Disk (SSD) having a serial interface compatible with a particular serial interface standard selectively enables coalescing of status information for return to a host based on detecting a particular host transfer rate capability. Some hosts are not fully compliant with the particular standard, being unable to properly process the coalesced status information. The selective enablement disables status coalescing for a non-compliant host and enables status coalescing for at least some compliant hosts, without the SSD having prior knowledge of coupling to a noncompliant/compliant host. The SSD conservatively determines the host is non-compliant/compliant based on a negotiated speed of the serial interface, and selectively disables/enables status coalescing in response to the negotiated speed.

19 Claims, 4 Drawing Sheets

(56) References Cited

U.S. PATENT DOCUMENTS

2010/0082890 A1* 4/2010 Heo et al. .................. 711/103
2010/0153590 A1* 6/2010 Hsin et al. .................. 710/22
2010/0293305 A1 11/2010 Park et al.
2011/0231685 A1* 9/2011 Huang et al. .................. 713/321
2012/0023350 A1* 1/2012 Russo et al. .................. 713/320

OTHER PUBLICATIONS

Written Opinion in the parent PCT/US12/23567, 4 pages.

* cited by examiner

US 9,092,160 B2

SELECTIVE ENABLEMENT OF OPERATING MODES OR FEATURES VIA HOST TRANSFER RATE DETECTION

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application (Ser. No. 61/440,710), filed 8 Feb. 2011, first named inventor Andrew John TOMLIN, and entitled Selective Enablement of Status Coalescing via Host Transfer Rate Detection.

BACKGROUND

1. Field

Advancements in interfacing hosts with storage systems/sub-systems are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

Figure 1A:
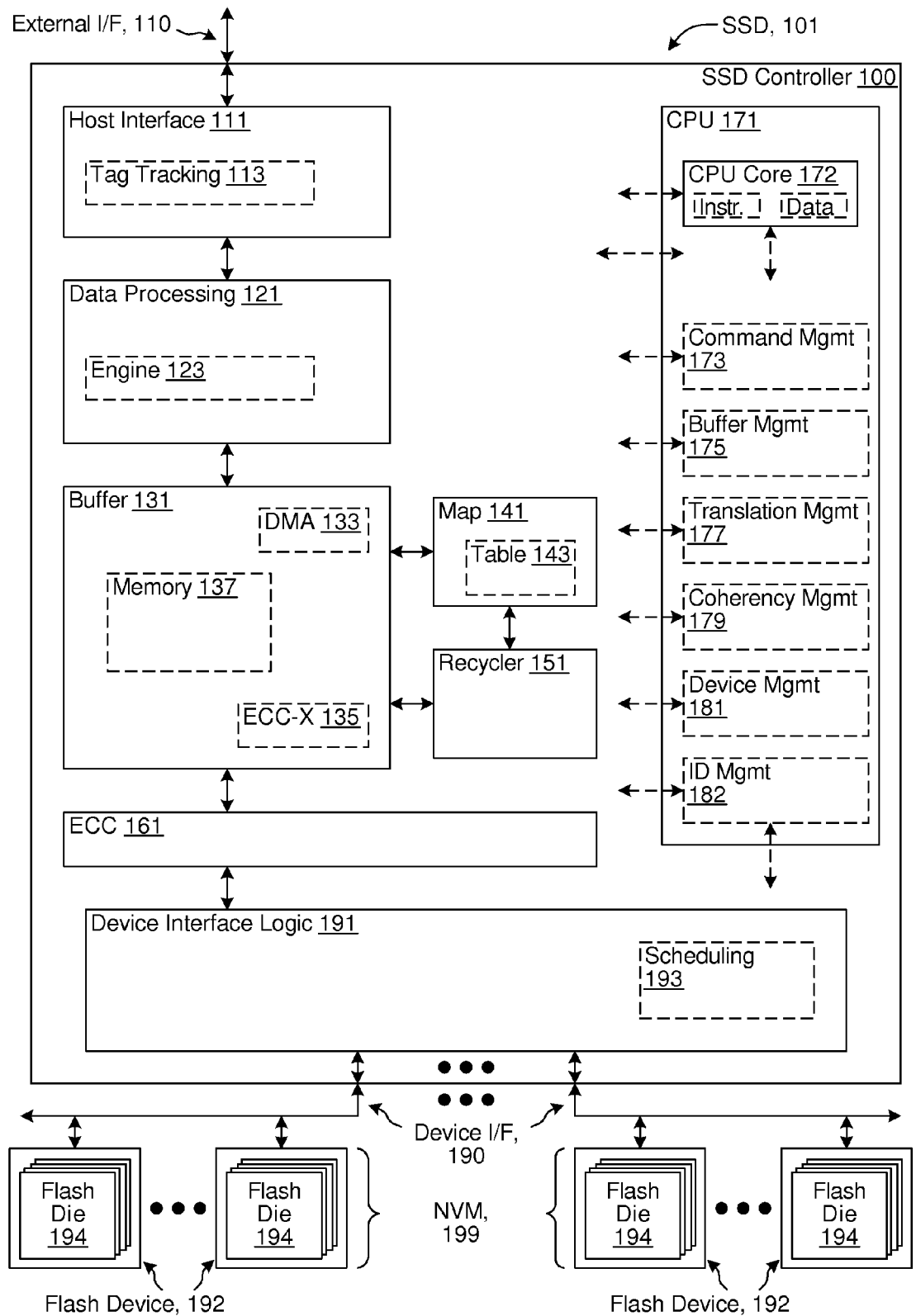
FIG. 1A illustrates selected details of an embodiment of a Solid-State Disk (SSD) including an SSD controller providing selective enablement of one or more operating modes and/or one or more features (such as status coalescing) via host transfer rate detection for managing an interface with a (computing) host, as well as circuitry for managing non-volatile storage, such as flash memories.

| \multicolumn{2}{l}{List of Reference Symbols in Drawings} |
| --- | --- |
| Ref. Symbol | Element Name |
| 100 | SSD Controller |
| 101 | SSD |
| 102 | Host |
| 102A | Host-6G |
| 102B | Host-3G/1.5G |
| 102C | Host-3G/1.5G |
| 103 | (optional) Switch/Fabric/Intermediate Controller |
| 104 | Intermediate Interfaces |
| 105 | OS |
| 106 | Firmware (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 200 | Flow Diagram |
| 201 | Start |
| 202 | Negotiate Speed with Host |
| 203 | 6G OK? |
| 204 | Disable Status Coalescing |

-continued

| List of Reference Symbols in Drawings | |
|---|---|
| Ref. Symbol | Element Name |
| 205 | Enable Status Coalescing |
| 299 | End |
| 1100DA | Negotiation |
| 1100DB | Negotiation |
| 1100DC | Negotiation |
| 1100IA | Negotiation |
| 1100IB | Negotiation |
| 1100IC | Negotiation |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.
Acronyms Elsewhere herein various shorthand abbreviations, or acronyms, sometimes refer to certain elements. The descriptions of at least some of the acronyms follow.

| Acronym | Description |
|---|---|
| AHCI | Advanced Host Controller Interface |
| API | Application Program Interface |
| ATA | Advanced Technology Attachment |
| ATAPI | Advanced Technology Attachment Packet Interface |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LBA | Logical Block Address |
| LDPC | Low-Density Parity-Check |
| LPN | Logical Page Number |
| MLC | Multi-Level Cell |
| MMC | MultiMediaCard |
| MPEG | Moving Picture Experts Group |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| POS | Point Of Sale |
| RAID | Redundant Array of Inexpensive/Independent Disks |
| RASIE | Redundant Array of Silicon Independent Elements |
| RS | Reed-Solomon |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SRAM | Static Random Access Memory |
| SSD | Solid-State Disk/Drive |
| UFS | Unified Flash Storage |
| USB | Universal Serial Bus |
| VF | Virtual Function |
| WAN | Wide Area Network |

In some situations, such as a host coupled to storage, for example a Solid-State Disk (SSD) having a serial interface compatible with a particular serial interface standard, status coalescing by the SSD for returning status information to the host enables enhanced performance. Some hosts are not fully compliant with the particular serial interface standard, being unable to properly process coalesced status information. Selective enablement of status coalescing via host transfer rate detection disables status coalescing when a non-compliant host is unable to properly process coalesced status and enables status coalescing for at least some compliant hosts that are enabled to properly process coalesced status, without the SSD having prior knowledge of coupling to a non-compliant/compliant host. The SSD conservatively determines the host is non-compliant/compliant based on a negotiated speed of the serial interface, and selectively disables/enables status coalescing in response to the negotiated speed. An example of the serial interface is a Serial Advanced Technology Attachment (SATA) interface.

In various embodiments, an SSD controller includes a host interface for interfacing with a computing host, a flash interface for interfacing with flash memory (used, e.g., to provide non-volatile storage that retains information without application of power), and circuitry for controlling the interfaces and performing (and/or controlling various aspects of the performing) selective enablement of status coalescing via host transfer rate detection.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as an SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1

A system comprising:
a means for serially interfacing a host with storage;
a means for determining if the means for serially interfacing is operating at a nominal serial data transfer rate that is greater/less than a threshold; and
a means for selectively enabling/disabling an operating mode and/or feature, the means for selectively enable/disabling being dependent at least in part on the means for determining.

EC2

The system of EC1, wherein the means for serially interfacing is compatible with at least one version of a Serial Advanced Technology Attachment (SATA) standard.

EC3

The system of EC1, wherein the threshold is 6 Gb.

EC4

The system of EC1, wherein the storage comprises a storage system/sub-system.

EC5

The system of EC1, wherein the storage comprises one or more Solid State Disks (SSDs), Hard Disk Drives (HDDs), Compact Disk (CD) and/or Digital Versatile/Video Disk (DVD) drives, and tape drives.

EC6

The system of EC1, wherein the means for serially interfacing is comprised in a Solid State Disk (SSD), and the storage comprises flash memory comprised in the SSD.

EC7

The system of EC1, wherein the means for serially interfacing is compatible with at least one version of a Serial Advanced Technology Attachment (SATA) standard, the threshold is 6 Gb, the means for serially interfacing is comprised in a Solid State Disk (SSD), and the storage comprises flash memory comprised in the SSD.

EC8

The system of EC1, wherein the host is an interfacing host.

EC9

The system of EC8, wherein the interfacing host comprises one or more of a storage bridge and a storage expander.

EC10

The system of EC1, wherein the host is a computing host.

EC11

The system of EC10, further comprising all or any portions of the computing host.

EC12

The system of EC1, wherein the means for serially interfacing is compatible with a storage interface standard.

EC13

The system of EC1, wherein the storage comprises one or more flash memories and further comprising a means for interfacing with the flash memories.

EC14

The system of EC13, wherein the means for interfacing with the flash memories comprises a flash memory interface.

EC15

The system of EC13, further comprising at least one of the flash memories.

EC16

The system of EC13, wherein the means are collectively implemented in a single Integrated Circuit (IC).

EC17

The system of EC13, wherein the means are comprised in a Solid-State Disk (SSD).

EC18

The system of EC13, wherein the means are comprised in a controller of a Solid-State Disk (SSD).

EC19

The system of EC1, wherein a first version of a serial interface standard specifies operation at a maximum nominal serial data transfer rate that is at or above the threshold and the first version of the serial interface standard specifies the operating mode and/or feature.

EC20

The system of EC19, wherein a second version of the serial interface standard specifies operation at a maximum nominal serial data transfer rate that is below the threshold.

EC21

The system of EC19, wherein a second version of the serial interface standard lacks any specification of the operating mode and/or feature.

EC22

The system of EC19, wherein a second version of the serial interface standard specifies operation at a maximum nominal serial data transfer rate that is below the threshold and lacks any specification of the operating mode and/or feature.

EC23

A method comprising:
serially interfacing a host with storage;
determining if the serially interfacing is operating at a nominal serial data transfer rate that is greater/less than a threshold; and
selectively enabling/disabling an operating mode and/or feature, the selectively enable/disabling being dependent at least in part on the determining.

EC24

The method of EC23, wherein the serially interfacing is compatible with at least one version of a Serial Advanced Technology Attachment (SATA) standard.

EC25

The method of EC23, wherein the threshold is 6 Gb.

EC26

The method of EC23, wherein the storage comprises a storage system/sub-system.

EC27

The method of EC23, wherein the storage comprises one or more Solid State Disks (SSDs), Hard Disk Drives (HDDs), Compact Disk (CD) and/or Digital Versatile/Video Disk (DVD) drives, and tape drives.

EC28

The method of EC23, wherein the serially interfacing is performed in a Solid State Disk (SSD), and the storage comprises flash memory comprised in the SSD.

EC29

The method of EC23, wherein the serially interfacing is compatible with at least one version of a Serial Advanced Technology Attachment (SATA) standard, the threshold is 6 Gb, the serially interfacing is performed in a Solid State Disk (SSD), and the storage comprises flash memory comprised in the SSD.

EC30

The method of EC23, wherein the host is an interfacing host.

EC31

The method of EC30, wherein the interfacing host comprises one or more of a storage bridge and a storage expander.

EC32

The method of EC23, wherein the host is a computing host.

EC33

The method of EC32, further comprising operating all or any portions of the computing host.

EC34

The method of EC23, wherein the serially interfacing is compatible with a storage interface standard.

EC35

The method of EC23, wherein the storage comprises one or more flash memories and further comprising interfacing with the flash memories.

EC36

The method of EC35, wherein the interfacing with the flash memories comprises operating a flash memory interface.

EC37

The method of EC35, further comprising operating at least one of the flash memories.

EC38

The method of EC35, wherein the serially interfacing with the host is at least in part via operating a host interface, the interfacing with the flash memories is at least in part via operating a flash memory interface, and the host interface and the flash memory interface are collectively implemented in a single Integrated Circuit (IC).

EC39

The method of EC35, wherein the serially interfacing with the host is at least in part via operating a host interface, the interfacing with the flash memories is at least in part via operating a flash memory interface, and the host interface and the flash memory interface are comprised in a Solid-State Disk (SSD).

EC40

The method of EC35, wherein the serially interfacing with the host is at least in part via operating a host interface, the interfacing with the flash memories is at least in part via operating a flash memory interface, and the host interface and the flash memory interface are comprised in a controller of a Solid-State Disk (SSD).

EC41

The method of EC23, wherein a first version of a serial interface standard specifies operation at a maximum nominal serial data transfer rate that is at or above the threshold and the first version of the serial interface standard specifies the operating mode and/or feature.

EC42

The method of EC41, wherein a second version of the serial interface standard specifies operation at a maximum nominal serial data transfer rate that is below the threshold.

EC43

The method of EC41, wherein a second version of the serial interface standard lacks any specification of the operating mode and/or feature.

EC44

The method of EC41, wherein a second version of the serial interface standard specifies operation at a maximum nominal serial data transfer rate that is below the threshold and lacks any specification of the operating mode and/or feature.

EC45

A system comprising:
host interface circuitry enabled to serially interface a host with storage;
serial data rate determining circuitry enabled to determine if the host interface circuitry is operating at a nominal serial data transfer rate that is greater/less than a threshold; and
operating mode and/or feature control circuitry enabled to selectively enable/disable an operating mode and/or feature, the operating mode and/or feature control circuitry being dependent at least in part on the serial data rate determining circuitry.

EC46

The system of EC45, wherein the host interface circuitry is compatible with at least one version of a Serial Advanced Technology Attachment (SATA) standard.

EC47

The system of EC45, wherein the threshold is 6 Gb.

EC48

The system of EC45, wherein the storage comprises a storage system/sub-system.

EC49

The system of EC45, wherein the storage comprises one or more Solid State Disks (SSDs), Hard Disk Drives (HDDs), Compact Disk (CD) and/or Digital Versatile/Video Disk (DVD) drives, and tape drives.

EC50

The system of EC45, wherein the host interface circuitry is comprised in a Solid State Disk (SSD), and the storage comprises flash memory comprised in the SSD.

EC51

The system of EC45, wherein the host interface circuitry is compatible with at least one version of a Serial Advanced Technology Attachment (SATA) standard, the threshold is 6 Gb, the host interface circuitry is comprised in a Solid State Disk (SSD), and the storage comprises flash memory comprised in the SSD.

EC52

The system of EC45, wherein the host is an interfacing host.

EC53

The system of EC52, wherein the interfacing host comprises one or more of a storage bridge and a storage expander.

EC54

The system of EC45, wherein the host is a computing host.

EC55

The system of EC54, further comprising all or any portions of the computing host.

EC56

The system of EC45, wherein the host interface circuitry is compatible with a storage interface standard.

EC57

The system of EC45, wherein the storage comprises one or more flash memories and further comprising flash interface circuitry enabled to interface with the flash memories.

EC58

The system of EC57, wherein the flash interface circuitry comprises a flash memory interface.

EC59

The system of EC57, further comprising at least one of the flash memories.

EC60

The system of EC57, wherein the host interface circuitry and the flash interface circuitry are collectively implemented in a single Integrated Circuit (IC).

EC61

The system of EC57, wherein the host interface circuitry and the flash interface circuitry are comprised in a Solid-State Disk (SSD).

EC62

The system of EC57, wherein the host interface circuitry and the flash interface circuitry are comprised in a controller of a Solid-State Disk (SSD).

EC63

The system of EC45, wherein a first version of a serial interface standard specifies operation at a maximum nominal serial data transfer rate that is at or above the threshold and the first version of the serial interface standard specifies the operating mode and/or feature.

EC64

The system of EC63, wherein a second version of the serial interface standard specifies operation at a maximum nominal serial data transfer rate that is below the threshold.

EC65

The system of EC63, wherein a second version of the serial interface standard lacks any specification of the operating mode and/or feature.

EC66

The system of EC63, wherein a second version of the serial interface standard specifies operation at a maximum nominal serial data transfer rate that is below the threshold and lacks any specification of the operating mode and/or feature.

EC67

A tangible computer readable medium having a set of instructions stored therein that when executed by a processing element cause the processing element to perform operations comprising:
 managing serially interfacing a host with storage;
 managing determining if the serially interfacing is operating at a nominal serial data transfer rate that is greater/less than a threshold; and
 managing selectively enabling/disabling an operating mode and/or feature, the selectively enable/disabling being dependent at least in part on the determining.

EC68

The tangible computer readable medium of EC67, wherein the serially interfacing is compatible with at least one version of a Serial Advanced Technology Attachment (SATA) standard.

EC69

The tangible computer readable medium of EC67, wherein the threshold is 6 Gb.

EC70

The tangible computer readable medium of EC67, wherein the storage comprises a storage system/sub-system.

EC71

The tangible computer readable medium of EC67, wherein the storage comprises one or more Solid State Disks (SSDs), Hard Disk Drives (HDDs), Compact Disk (CD) and/or Digital Versatile/Video Disk (DVD) drives, and tape drives.

EC72

The tangible computer readable medium of EC67, wherein the serially interfacing is performed in a Solid State Disk (SSD), and the storage comprises flash memory comprised in the SSD.

EC73

The tangible computer readable medium of EC67, wherein the serially interfacing is compatible with at least one version of a Serial Advanced Technology Attachment (SATA) standard, the threshold is 6 Gb, the serially interfacing is performed in a Solid State Disk (SSD), and the storage comprises flash memory comprised in the SSD.

EC74

The tangible computer readable medium of EC67, wherein the host is an interfacing host.

EC75

The tangible computer readable medium of EC74, wherein the interfacing host comprises one or more of a storage bridge and a storage expander.

EC76

The tangible computer readable medium of EC67, wherein the host is a computing host.

EC77

The tangible computer readable medium of EC76, further comprising managing operating all or any portions of the computing host.

EC78

The tangible computer readable medium of EC67, wherein the serially interfacing is compatible with a storage interface standard.

EC79

The tangible computer readable medium of EC67, wherein the storage comprises one or more flash memories and further comprising managing interfacing with the flash memories.

EC80

The tangible computer readable medium of EC79, wherein the managing interfacing with the flash memories comprises managing operating a flash memory interface.

EC81

The tangible computer readable medium of EC79, further comprising managing operating at least one of the flash memories.

EC82

The tangible computer readable medium of EC79, wherein the managing serially interfacing with the host is at least in part via managing operating a host interface, the managing interfacing with the flash memories is at least in part via managing operating a flash memory interface and the host interface, and the flash memory interface are collectively implemented in a single Integrated Circuit (IC).

EC83

The tangible computer readable medium of EC79, wherein the managing serially interfacing with the host is at least in part via managing operating a host interface, the managing interfacing with the flash memories is at least in part via managing operating a flash memory interface and the host interface, and the flash memory interface are comprised in a Solid-State Disk (SSD).

EC84

The tangible computer readable medium of EC79, wherein the managing serially interfacing with the host is at least in part via managing operating a host interface, the managing interfacing with the flash memories is at least in part via managing operating a flash memory interface and the host interface, and the flash memory interface are comprised in a controller of a Solid-State Disk (SSD).

EC85

The tangible computer readable medium of EC67, wherein a first version of a serial interface standard specifies operation at a maximum nominal serial data transfer rate that is at or above the threshold and the first version of the serial interface standard specifies the operating mode and/or feature.

EC86

The tangible computer readable medium of EC85, wherein a second version of the serial interface standard specifies operation at a maximum nominal serial data transfer rate that is below the threshold.

EC87

The tangible computer readable medium of EC85, wherein a second version of the serial interface standard lacks any specification of the operating mode and/or feature.

EC88

The tangible computer readable medium of EC85, wherein a second version of the serial interface standard specifies operation at a maximum nominal serial data transfer rate that is below the threshold and lacks any specification of the operating mode and/or feature.

EC89

Any of the foregoing ECs having or referring to a storage interface standard, wherein the storage interface standard comprises one or more of
- a Universal Serial Bus (USB) interface standard,
- a Compact Flash (CF) interface standard,
- a MultiMediaCard (MMC) interface standard,
- an embedded MMC (eMMC) interface standard,
- a Thunderbolt interface standard,
- a UFS interface standard,
- a Secure Digital (SD) interface standard,
- a Memory Stick interface standard,
- an xD-picture card interface standard,
- an Integrated Drive Electronics (IDE) interface standard,
- a Serial Advanced Technology Attachment (SATA) interface standard,
- an external SATA (eSATA) interface standard,
- a Small Computer System Interface (SCSI) interface standard,
- a Serial Attached Small Computer System Interface (SAS) interface standard, a Fibre Channel interface standard,
an Ethernet interface standard, and
a Peripheral Component Interconnect express (PCIe) interface standard.

EC90

Any of the foregoing ECs having or referring to a computing host, wherein the computing host comprises all or any portions of one or more of
- a computer,
- a workstation computer,
- a server computer,
- a storage server,
- a Storage Attached Network (SAN),
- a Network Attached Storage (NAS) device,
- a Direct Attached Storage (DAS) device,
- a storage appliance,
- a Personal Computer (PC),
- a laptop computer,
- a notebook computer,
- a netbook computer,
- a tablet device or computer,
- an ultrabook computer,
- an electronic reading device (an e-reader),
- a Personal Digital Assistant (PDA),
- a navigation system,
- a (handheld) Global Positioning System (GPS) device,
- an automotive control system,
- an automotive media control system or computer,
- a printer, copier or fax machine or all-in-one device,
- a Point Of Sale (POS) device,
- a cash-register,
- a media player,
- a television,
- a media recorder,
- a Digital Video Recorder (DVR),
- a digital camera,
- a cellular handset,
- a cordless telephone handset, and
- an electronic game.

EC91

Any of the foregoing ECs having or referring to a at least one flash memory, wherein at least a portion of the at least one flash memory comprises one or more of
- NAND flash technology storage cells, and
- NOR flash technology storage cells.

EC92

Any of the foregoing ECs having or referring to a at least one flash memory, wherein at least a portion of the at least one flash memory comprises one or more of
- Single-Level Cell (SLC) flash technology storage cells, and
- Multi-Level Cell (MLC) flash technology storage cells.

EC93

Any of the foregoing ECs having or referring to a at least one flash memory, wherein at least a portion of the at least one flash memory comprises one or more of
- polysilicon technology-based charge storage cells, and
- silicon nitride technology-based charge storage cells.

EC94

Any of the foregoing ECs having or referring to a at least one flash memory, wherein at least a portion of the at least one flash memory comprises one or more of
- two-dimensional technology-based flash memory technology, and
- three-dimensional technology-based flash memory technology.

EC95

Any of the foregoing ECs having or referring to a flash memory interface, wherein the flash memory interface is compatible with one or more of
- an Open NAND Flash Interface (ONFI),
- a Toggle-mode interface,
- a Double-Data-Rate (DDR) synchronous interface,
- a DDR2 synchronous interface,
- a synchronous interface, and
- an asynchronous interface.

System

FIG. 1A illustrates selected details of an embodiment of an SSD including an SSD controller providing various techniques for selective enablement of one or more operating modes and/or one or more features (such as status coalescing) via host transfer rate detection for managing an interface with a (computing) host, as well as circuitry for managing non-volatile storage, such as flash memories. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
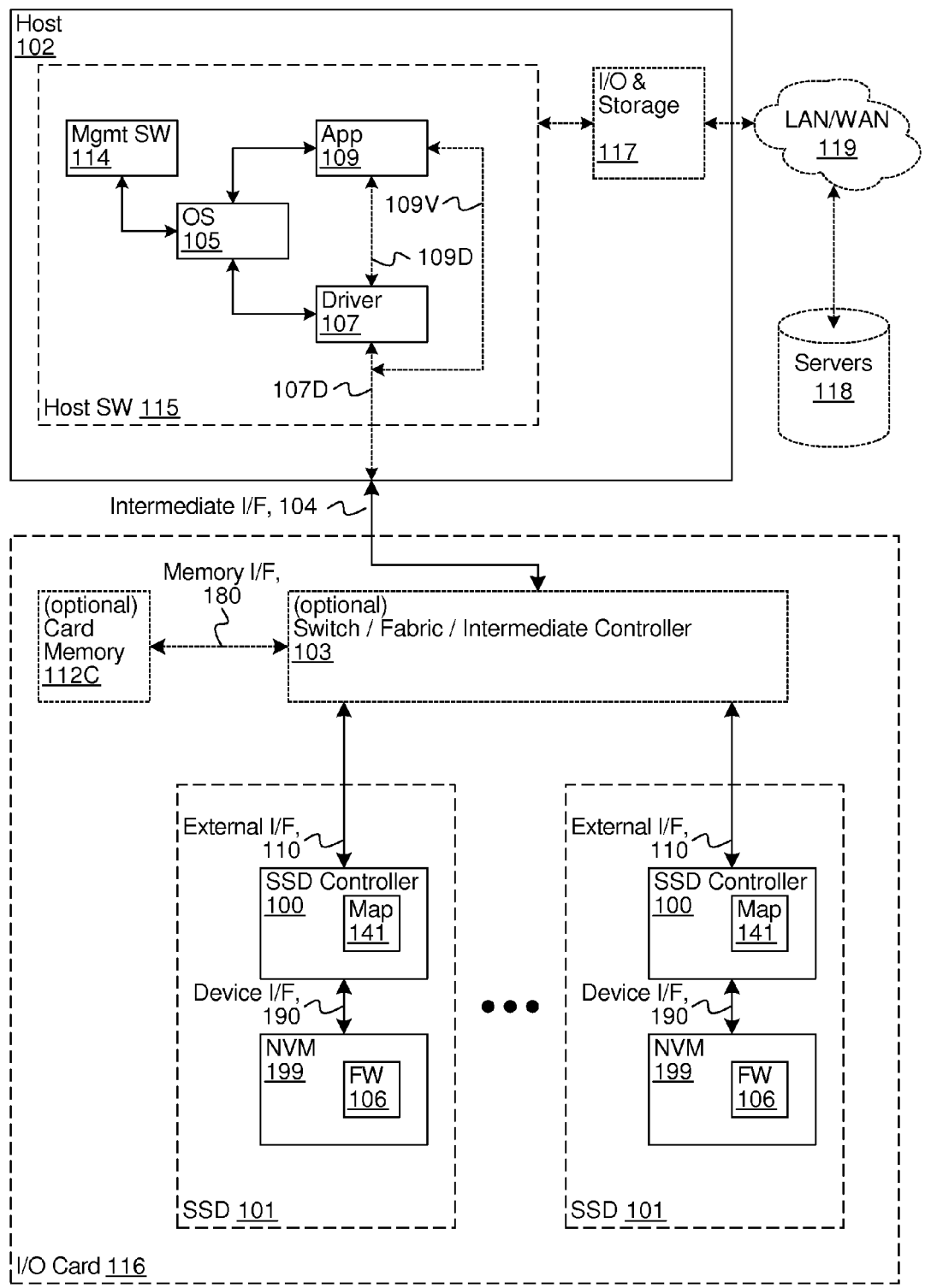
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software→←I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application→←I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application→←I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the host directly via External Interfaces 110. In various embodiments, SSD Controller 100 is coupled to the host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments where Host 102 is a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Figure 1C:
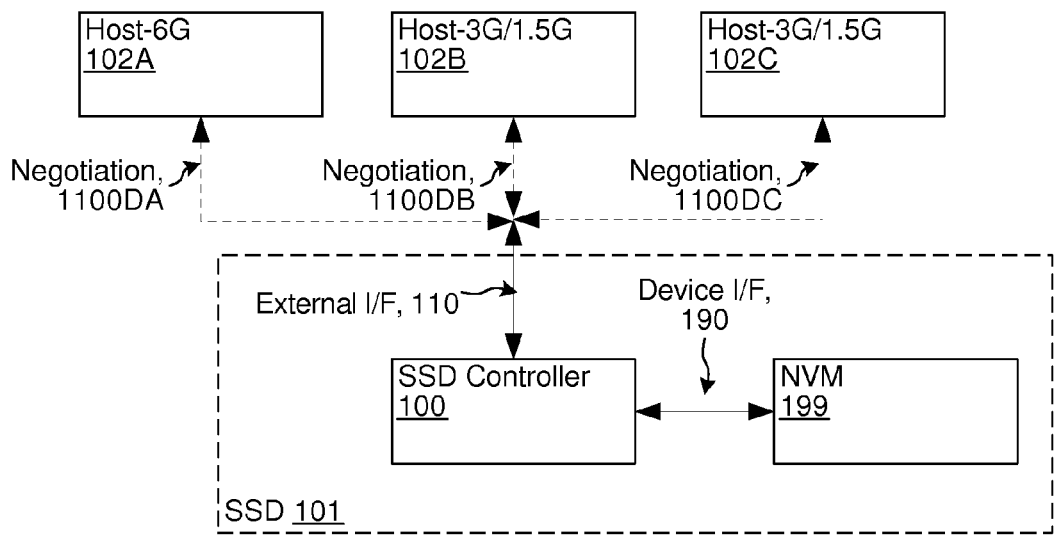
FIG. 1C illustrates selected details of an embodiment of a system including the SSD of FIG. 1A.

FIG. 1C illustrates selected details of an embodiment of a system including the SSD of FIG. 1A. SSD 101 includes SSD Controller 100 coupled to NVM 199 via Device Interfaces 190. The SSD is coupled to any combination of Host 6G 102A, Host 3G/1.5G 102B, and Host 3G/1.5G 102C via External Interfaces 110 as indicated conceptually by dashed lines Negotiation 1100DA, Negotiation 1100DB, and Negotiation 1100DC (as described in more detail with respect to FIG. 2). In various embodiments, any one or more of Host 6G 102A, Host 3G/1.5G 102B, and Host 3G/1.5G 102C correspond to various implementations of Host 102 of FIG. 1B. In some embodiments, SSD 101 (or variations thereof) corresponds to a SAS drive or a SATA drive that is coupled to an initiator operating as any one or more of Host 102, Host 6G 102A, Host 3G/1.5G 102B, and Host 3G/1.5G 102C. In various embodiments and/or usage scenarios, embodiments represented by FIG. 1C correspond to embodiments represented by FIG. 1B when Switch/Fabric/Intermediate Controller 103 is, e.g., omitted, bypassed, or passed-through.

Figure 1D:
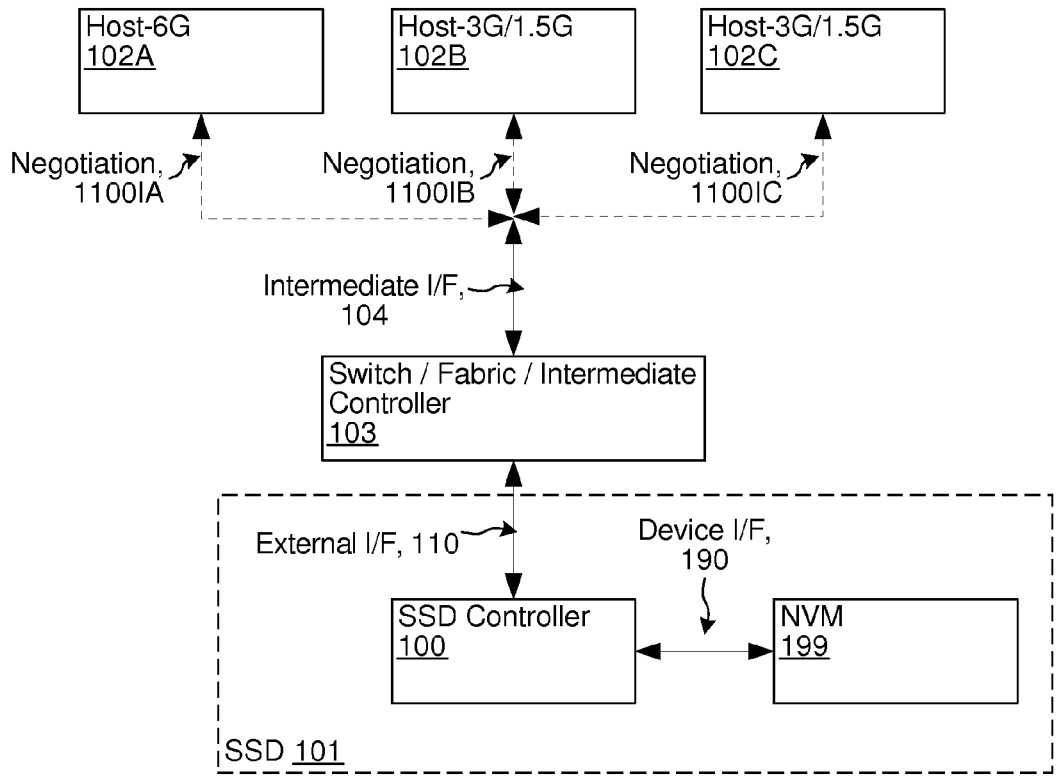
FIG. 1D illustrates selected details of an embodiment of a system including the SSD of FIG. 1A.

FIG. 1D illustrates selected details of an embodiment of a system including the SSD of FIG. 1A. As in FIG. 1C, SSD 101 includes SSD Controller 100 coupled to NVM 199 via Device Interfaces 190. The SSD is coupled to any combination of Host 6G 102A, Host 3G/1.5G 102B, and Host 3G/1.5G 102C via External Interfaces 110 in turn coupled to Switch/Fabric/Intermediate Controller 103 and then to any combination of Host 6G 102A, Host 3G/1.5G 102B, and Host 3G/1.5G 102C via Intermediate Interfaces 104 as indicated conceptually by dashed lines Negotiation 1100IA, Negotiation 1100IB, and Negotiation 1100IC (as described in more detail with respect to FIG. 2). In various embodiments, SSD Controller 100 is coupled to the host(s) via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In various embodiments and/or usage scenarios, embodiments represented by FIG. 1D correspond to embodiments represented by FIG. 1B when Switch/Fabric/Intermediate Controller 103 is, e.g., present and not bypassed or passed-through.

In some embodiments and/or usage scenarios, Host 6G 102A, Host 3G/1.5G 102B, and Host 3G/1.5G 102C are hosts each with a serial interface (such as a SATA interface). For example, Host 6G 102A is enabled to transfer serial data at a maximum rate termed a "6 Gb" rate having a nominal 6 Gb rate (and is also enabled to transfer data at lower rates termed "3 Gb" and "1.5 Gb" rates having respective 3 Gb and 1.5 Gb nominal rates), while hosts 3G/1.5G 102B and 102C are enabled to transfer data at a maximum rate of the 3 Gb rate (and are also enabled to transfer data at a lower rate such as the 1.5 Gb rate).

Selective Enablement of Status Coalescing Via Host Transfer Rate Detection

In some embodiments and/or usage scenarios (such as some embodiments where a host is coupled to a storage system/sub-system, e.g. a computing host coupled to an SSD via a serial interface), status coalescing enables enhanced performance. However, some hosts, such as some hosts that are not fully compliant with a particular serial interface standard (e.g. some embodiments where the host is not fully compliant with a particular SATA standard), are not enabled to properly process coalesced status information. Selective enablement of status coalescing via detection of host transfer rate of the serial interface disables status coalescing in situations where a non-compliant host is not enabled to properly process coalesced status and enables status coalescing in at least some situations where a compliant host is enabled to properly process coalesced status, without the storage system/sub-system having prior knowledge of coupling to a non-compliant or to a compliant host. The storage system/sub-system conservatively determines the host is non-compliant or compliant based on a negotiated speed of the serial interface with the host (e.g. a nominal serial data rate of a SATA interface).

With respect to FIGS. 1C and 1D, in some embodiments and/or usage scenarios, Host 6G 102A is compliant with a particular SATA standard and enabled to transfer data at a maximum nominal 6 Gb rate (as well as nominal 3 Gb and 1.5 Gb rates), while Host 3G/1.5G 102B is compliant with the particular SATA standard and enabled to transfer data at 3 Gb or 1.5 Gb rates (but not at a 6 Gb rate). Further, Host 3G/1.5G 102C is not fully compliant with the particular SATA standard (e.g. is unable to properly process coalesced status information) and is enabled to transfer data at nominal 3 Gb or 1.5 Gb rates (but not at 6 Gb).

Figure 2:
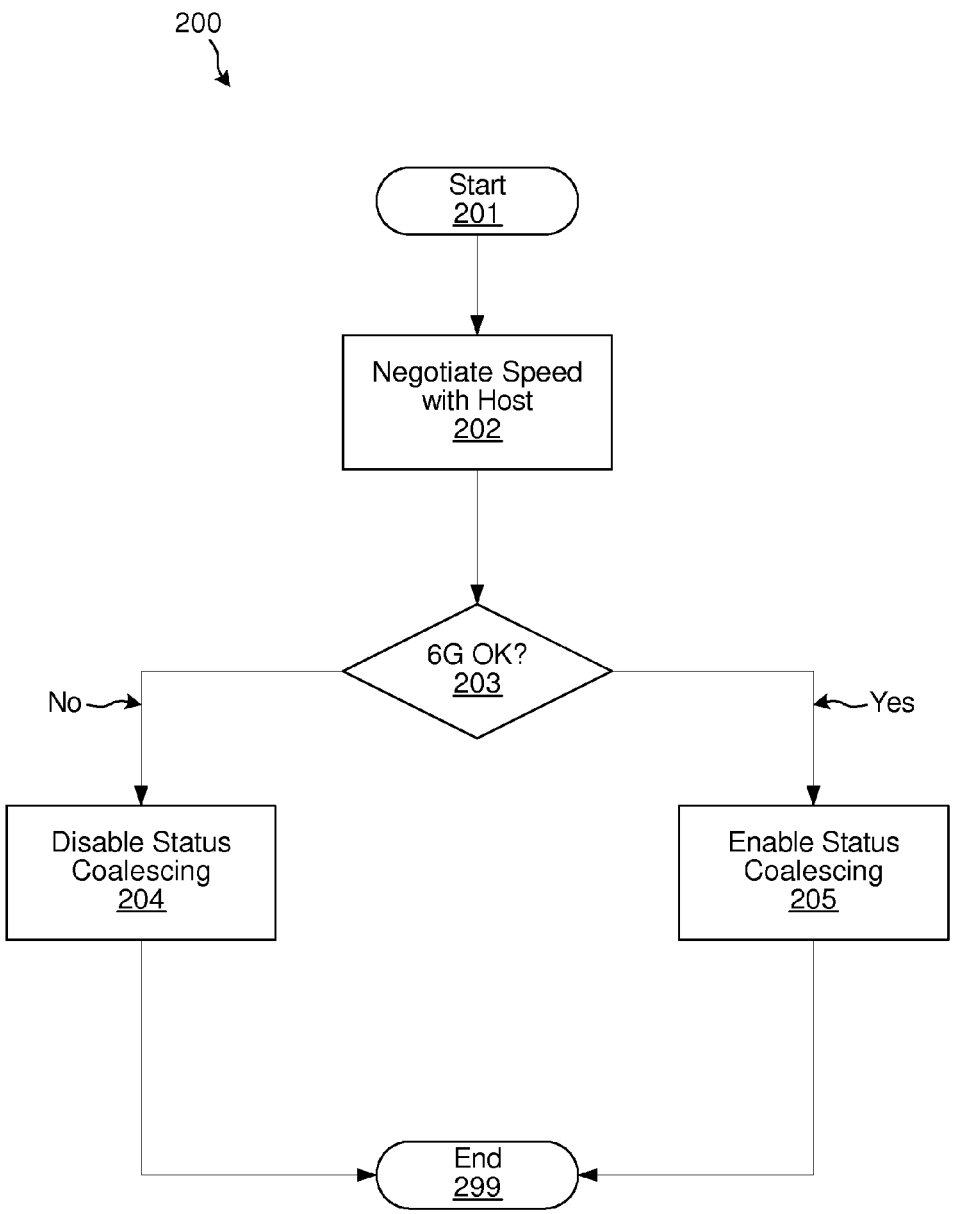
FIG. 2 illustrates a flow diagram of selected details of an embodiment of selective enablement of status coalescing via host transfer rate detection.

FIG. 2 illustrates a flow diagram of selected details of an embodiment of selective enablement of status coalescing via host transfer rate detection. Flow Diagram 200 is an example of operation of an SSD with an included controller (such as SSD 101 with SSD Controller 100 of FIGS. 1C and 1D) when coupling to hosts of various transfer rate capabilities (such as Host 6G 102A, Host 3G/1.5G 102B, and Host 3G/1.5G 102C directly as in FIG. 1C or indirectly as in FIG. 1D).

When the controller and the host are coupled, when a system reset occurs, when power is applied, or when any other even occurs that initiates a data rate negotiation between the host and the controller, flow begins (Start, 201). The host and the controller agree on a data transfer rate (Negotiate Speed with Host, 202). If the agreed data transfer rate is nominally 6 Gb (6G OK?, 203), then flow proceeds to turn on status combining (Enable Status Coalescing, 205), and flow is complete (End, 299). If the agreed data transfer rate is not nominally 6 Gb, then flow proceeds to turn off status combining (Disable Status Coalescing, 204). Flow is then complete (End, 299). After flow is complete, then the controller responds to host requests and returns status in response to certain requests, the returned status being at times coalesced when coalescing has been enabled and never coalesced when coalescing has been disabled. In various embodiments, rather than a determination that a transfer rate is a nominal value (e.g. 6 Gb), a determination is made that a transfer rate is above (or below) a nominal value, such as a predetermined threshold value.

As a first example of operation of Flow Diagram 200, consider SSD 101 with SSD Controller 100 coupling to Host 6G 102A (as illustrated in FIG. 1C). Host 6G 102A is compliant with a particular SATA standard, being enabled to properly process coalesced status information and further enabled to transfer data at a maximum nominal 6 Gb rate. With respect to FIG. 2, the host and the controller agree on a data transfer rate (Negotiate Speed with Host, 202) and the negotiation is indicated conceptually by dashed line Negotiation 1100DA in FIG. 1C. The host requests and obtains the maximum data rate of 6 Gb, and thus the agreed nominal data transfer rate is 6 Gb, so flow proceeds to turn on status combining (Enable Status Coalescing, 205). Flow is then complete. The controller then proceeds to operate with status coalescing enabled, returning status information to the host coalesced in some situations, enabling enhanced performance in some situations.

As a second example of operation of Flow Diagram 200, consider SSD 101 with SSD Controller 100 coupling to Host 3G/1.5G 102B (as illustrated in FIG. 1C). Host 3G/1.5G 102B is compliant with a particular SATA standard, being enabled to properly process coalesced status information and further enabled to transfer data at a maximum nominal 3 Gb rate. With respect to FIG. 2, the host and the controller agree on a data transfer rate (Negotiate Speed with Host, 202) and the negotiation is indicated conceptually by dashed line Negotiation 1100DB in FIG. 1C. The host requests and obtains the maximum data rate of 3 Gb, and thus the agreed nominal data transfer rate is 3 Gb, not 6 Gb, so flow (conservatively) proceeds to turn off status combining (Disable Status Coalescing, 204). Flow is then complete. The controller then proceeds to operate with status coalescing disabled, returning status information to the host without coalescing in any situations, even though the host is enabled to properly process coalesced status information.

As a third example of operation of Flow Diagram 200, consider SSD 101 with SSD Controller 100 coupling to Host 3G/1.5G 102C (as illustrated in FIG. 1C). Host 3G/1.5G 102C is not fully compliant with a particular SATA standard, being unable to properly process coalesced status information but is enabled to transfer data at a maximum nominal 3 Gb rate. With respect to FIG. 2, the host and the controller agree on a data transfer rate (Negotiate Speed with Host, 202) and the negotiation is indicated conceptually by dashed line Negotiation 1100DC in FIG. 1C. The host requests and obtains the maximum data rate of 3 Gb, and thus the agreed nominal data transfer rate is 3 Gb, not 6 Gb, so flow proceeds to turn off status combining (Disable Status Coalescing, 204). Flow is then complete. The controller then proceeds to operate with status coalescing disabled, returning status information to the host without coalescing in any situations, preventing the host from improperly processing coalesced status information.

Fourth, fifth, and sixth examples of operation of Flow Diagram 200 are similar, respectively, to the aforementioned first, second, and third, examples, but are based on FIG. 1D instead of FIG. 1C. The negotiations are indirect via Switch/Fabric/Intermediate Controller 103 and Intermediate Interfaces 104 as indicated conceptually by dashed lines Negotiation 1100IA, Negotiation 1100IB, and Negotiation 1100IC rather than directly between the host and the controller. As a result of Negotiation 1100IA (6 Gb) status coalescing is enabled, and as a result of Negotiations 1100IB and 1100IC (3 Gb) status coalescing is disabled.

In various embodiments, one or more elements of FIG. 1A manage or perform one or more operations (or portions thereof) illustrated in FIG. 2. For instance, the speed negotiation and/or the status information return to the host (whether coalesced or not) are in part via Host Interfaces 111. For another instance, the enabling/disabling of status coalescing is managed using a portion of software execution capabilities of CPU 171.

Although Flow Diagram 200 is specific with respect to a SATA interface, embodiments are contemplated where operation is with respect to a host and a storage system/subsystem coupled via a host-storage interface of a more general nature. For example, the host-storage interface is a serial interface that enables host communication with one or more mass storage devices (e.g. SDDs, HDDs, CD/DVD drives, tape drives, and other storage sub-systems enabled to store voluminous data). In some embodiments, the host-storage interface is a serial interface. In various embodiments, the serial interface has two pairs of conductors. In various embodiments, the serial interface is one or more of: operable with an (optional) input/output queuing protocol, compatible with native hot swapping, operable with commands that are backward compatible with ATA and ATAPI commands, and compatible with an industry standard SATA interface. In various embodiments, the serial interface is operable at various nominal data rates such as 6 Gb, 3 Gb, and 1.5 Gb.

Other Embodiments

In other various embodiments, host transfer data rate detection by a slave (e.g. a storage system/sub-system) is used by the slave to optimize and/or improve behavior of the slave and/or to selectively enable (or disable) one or more operating features of the slave. For example, a CF card detects a host enabled to transfer data at a rate greater than a predetermined threshold, and in response the CF card enables (disables) an operating mode and/or a feature that is otherwise disabled (enabled). For another example, a CF card detects a host enabled to transfer data at a rate less than a predetermined threshold, and in response the CF card enables (disables) an operating mode and/or a feature that is otherwise disabled (enabled).

In some embodiments and/or usage scenarios, operating speed (e.g. transfer rate of an interface) implies operation up to a particular revision level of a standard (e.g. interface standard revision level), and speed detection is usable to infer compliance with the particular standard revision level. For example, a higher operating speed implies that a higher level of a standard is being complied with, and that operating modes and/or features described by the higher level of the standard are properly supported. Therefore the proper support of the operating modes and/or features is inferable via detection of the higher operating speed. For another example, a lower operating speed implies that a lower level of a standard is being wholly or partially complied with, e.g. operation is incompatible with the lower level of the standard. Therefore possible non-compliance of the proper support of the operating modes and/or features is inferable via detection of the lower operating speed.

Example Implementation Techniques

In some embodiments, various combinations of all or portions of operations performed by a system implementing selective enablement of operating modes or features (such as status coalescing) via host transfer rate detection for managing an interface with a (computing) host, as well as circuitry for managing non-volatile storage, e.g. with flash memories, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
a storage device configured to serially interface to a host; and
a storage controller configured to determine whether a negotiated data transfer rate of a serial interface between the storage device and the host is at or above a predetermined threshold, the storage controller selectively enabling at least one storage-interface operating mode or feature when the negotiated data transfer rate is at or above the predetermined threshold,
wherein the serial interface and the storage controller are comprised in one or more Solid State Disks (SSDs), Hard Disk Drives (HDDs), Compact Disk (CD) and/or Digital Versatile/Video Disk (DVD) drives, and tape drives, and
wherein the at least one operating mode or feature comprises coalescing of status information returned to the host via status combining across multiple host requests.

2. The system of claim 1, wherein the storage controller selectively disables the at least one storage-interface operating mode or feature when the negotiated data transfer rate is less than the predetermined threshold.

3. The system of claim 1, wherein a first version of a serial interface standard specifies operation at a maximum nominal serial data transfer rate that is at or above the predetermined threshold, the first version of the serial interface standard specifies the at least one storage-interface operating mode or feature, a second version of the serial interface standard specifies operation at a maximum nominal serial data transfer rate that is below the predetermined threshold, the serial interface is compatible with the first and the second versions of the serial interface standard, and the serial interface is not compatible with the second version of the serial interface standard when the at least one storage-interface operating mode or feature is enabled.

4. The system of claim 3, wherein the first and the second versions of the serial interface standard correspond to respective versions of a Serial Advanced Technology Attachment (SATA) standard.

5. The system of claim 1, wherein the serial interface is compatible with at least one version of a Serial Advanced Technology Attachment (SATA) standard and the predetermined threshold is 6 Gb.

6. The system of claim 1, further comprising the host, and wherein the host is enabled to process the coalesced status information.

7. The system of claim 1, wherein the serial interface and the storage controller are comprised in one or more Solid State Disks (SSDs), and the storage device comprises flash memory comprised in at least one of the SSDs.

8. A method comprising:
serially interfacing a host with storage; and
selectively controlling enablement of at least one storage-interface operating mode or feature, the selectively controlling enablement selectively enabling the at least one storage-interface operating mode or feature,
wherein the selectively controlling enablement is dependent at least in part on a negotiated data transfer rate of the serially interfacing,
wherein the selectively controlling enablement selectively enables the at least one storage-interface operating mode or feature when the negotiated data transfer rate is at or above a predetermined threshold, and
wherein the at least one storage-interface operating mode or feature comprises coalescing of status information be returned to the host via status combining across multiple host requests.

9. The method of claim 8, wherein the selectively controlling enablement selectively disables the at least one storage-interface operating mode or feature when the negotiated data transfer rate is less than the predetermined threshold.

10. The method of claim 8, wherein a first version of a serial interface standard specifies operation at a maximum nominal serial data transfer rate that is at or above the predetermined threshold, the first version of the serial interface standard specifies the at least one storage-interface operating mode or feature, a second version of the serial interface standard specifies operation at a maximum nominal serial data transfer rate that is below the predetermined threshold, the serially interfacing is compatible with the first and the second versions of the serial interface standard, and the serially interfacing is not compatible with the second version of the serial interface standard when the at least one storage-interface operating mode or feature is enabled.

11. The method of claim 10, wherein the first and the second versions of the serial interface standard correspond to respective versions of a Serial Advanced Technology Attachment (SATA) standard.

12. The method of claim 8, wherein the serially interfacing is compatible with at least one version of a Serial Advanced Technology Attachment (SATA) standard and the predetermined threshold is 6 Gb.

13. The method of claim 8, further comprising the host processing the coalesced status information.

14. The method of claim 8, wherein the serially interfacing and the selectively controlling enablement are implemented in one or more Solid State Disks (SSDs), Hard Disk Drives (HDDs), Compact Disk (CD) and/or Digital Versatile/Video Disk (DVD) drives, and tape drives.

15. The method of claim 8, wherein the serially interfacing and the selectively controlling enablement are implemented in one or more Solid State Disks (SSDs), and the storage comprises flash memory comprised in at least one of the SSDs.

16. A method comprising:
negotiating, by a storage controller, a nominal data transfer rate of a serial interface coupling a computing host and a solid state disk;
determining, by the storage controller, whether the nominal data transfer rate is at or above a predetermined threshold; and
selectively enabling, by the storage controller, coalescing of status information that is to be returned to the computing host via status combining across multiple host requests when it is determined that the nominal data transfer rate is at or above the predetermined threshold.

17. The method of claim 16, further comprising:
selectively disabling, by the storage controller, coalescing of status information that is to be returned to the computing host via status combining across multiple host requests when it is determined that the nominal data transfer rate is less than the predetermined threshold.

18. The method of claim 16, wherein the solid state disk comprises the storage controller that performs the negotiating, determining, and enabling.

19. The method of claim 16, wherein the predetermined threshold is 6Gb.

* * * * *